Dec. 5, 1950  E. J. HOFFMAN ET AL  2,532,309
ANTISKID DEVICE FOR MOTOR VEHICLES
Filed April 14, 1948  5 Sheets-Sheet 1
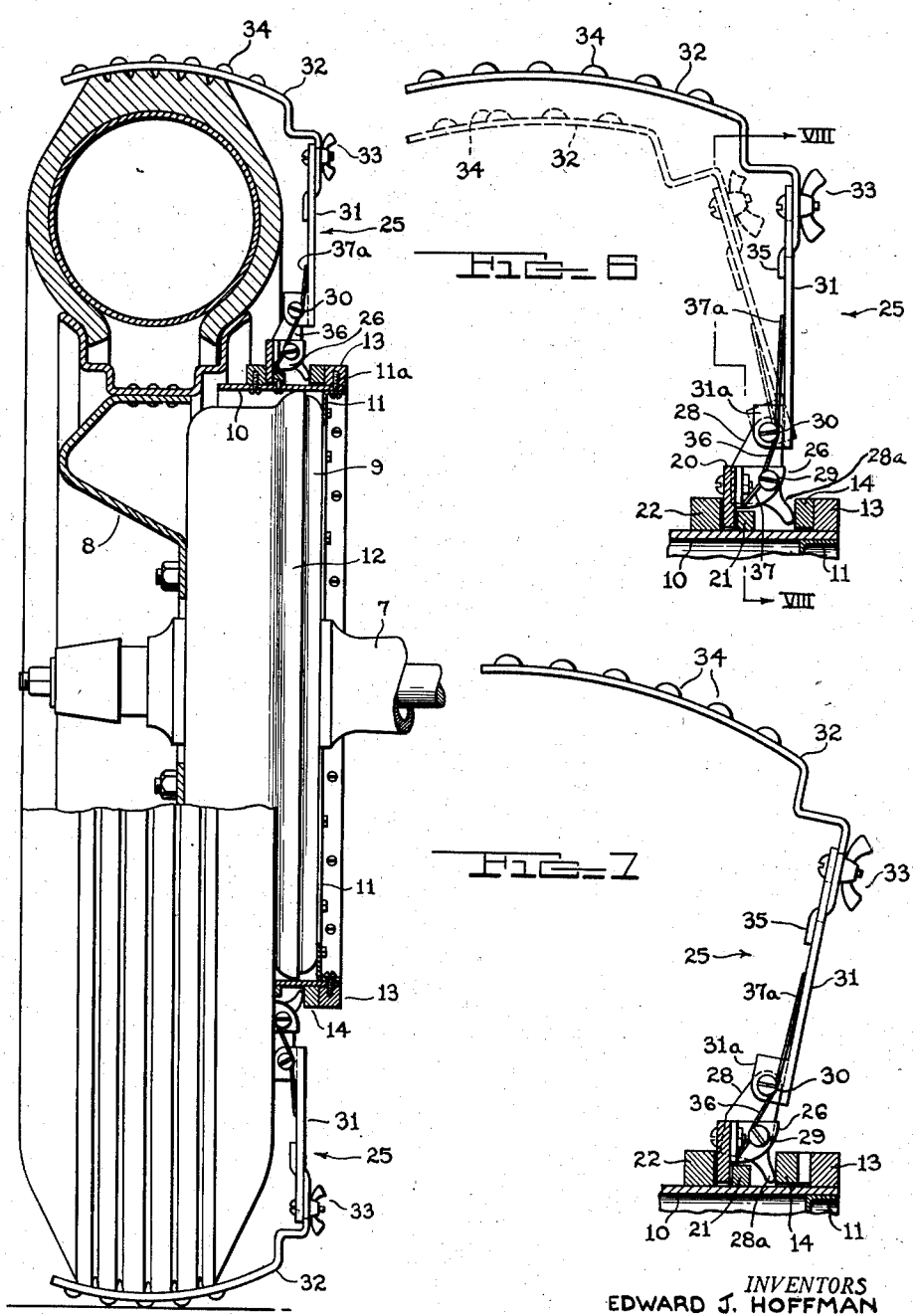
INVENTORS
EDWARD J. HOFFMAN
WILLIAM G. HARDY
BY ADAM J. FRIES
Ashworth Martin
ATTORNEY

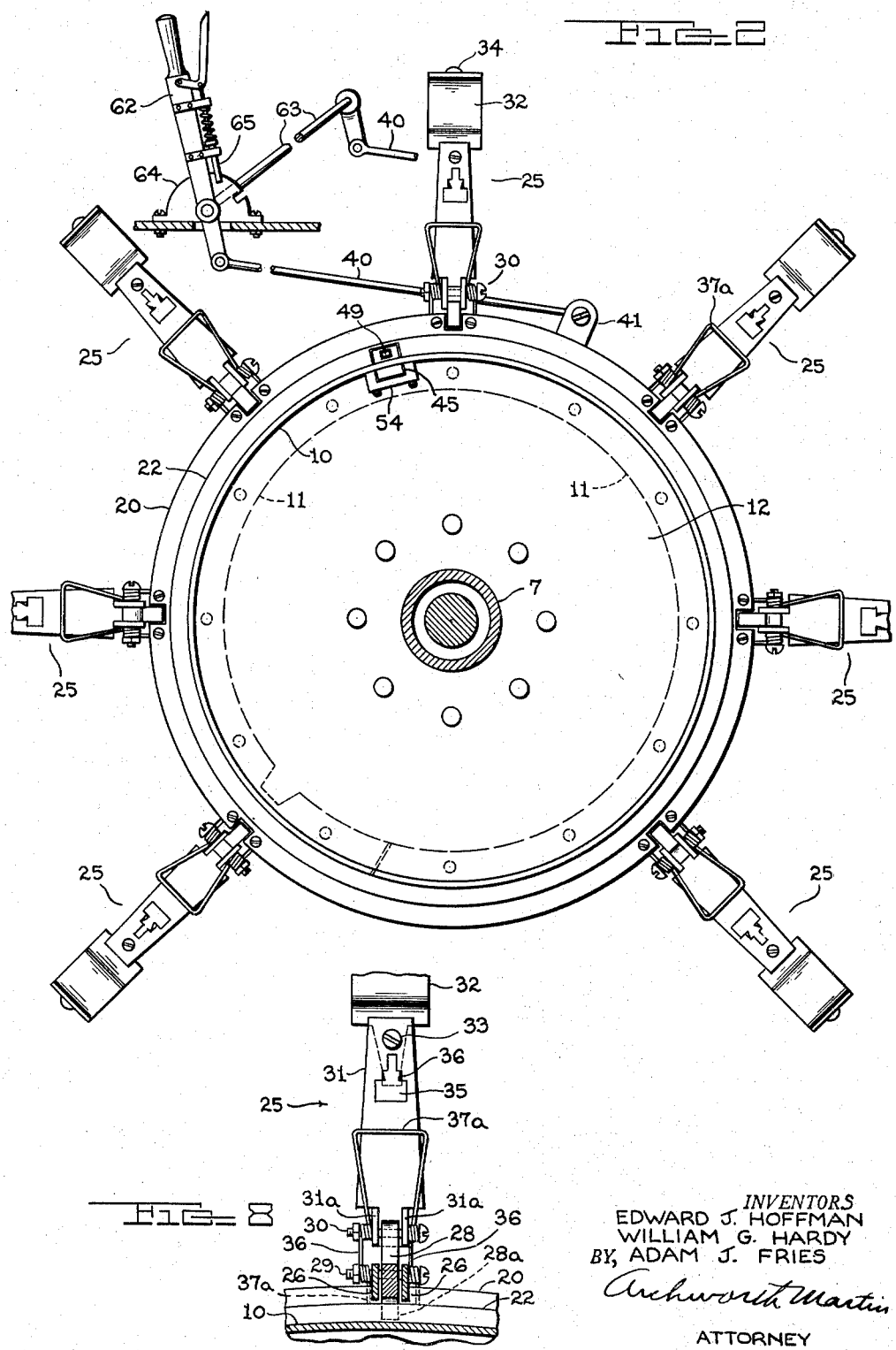

Dec. 5, 1950   E. J. HOFFMAN ET AL   2,532,309
ANTISKID DEVICE FOR MOTOR VEHICLES
Filed April 14, 1948   5 Sheets-Sheet 3
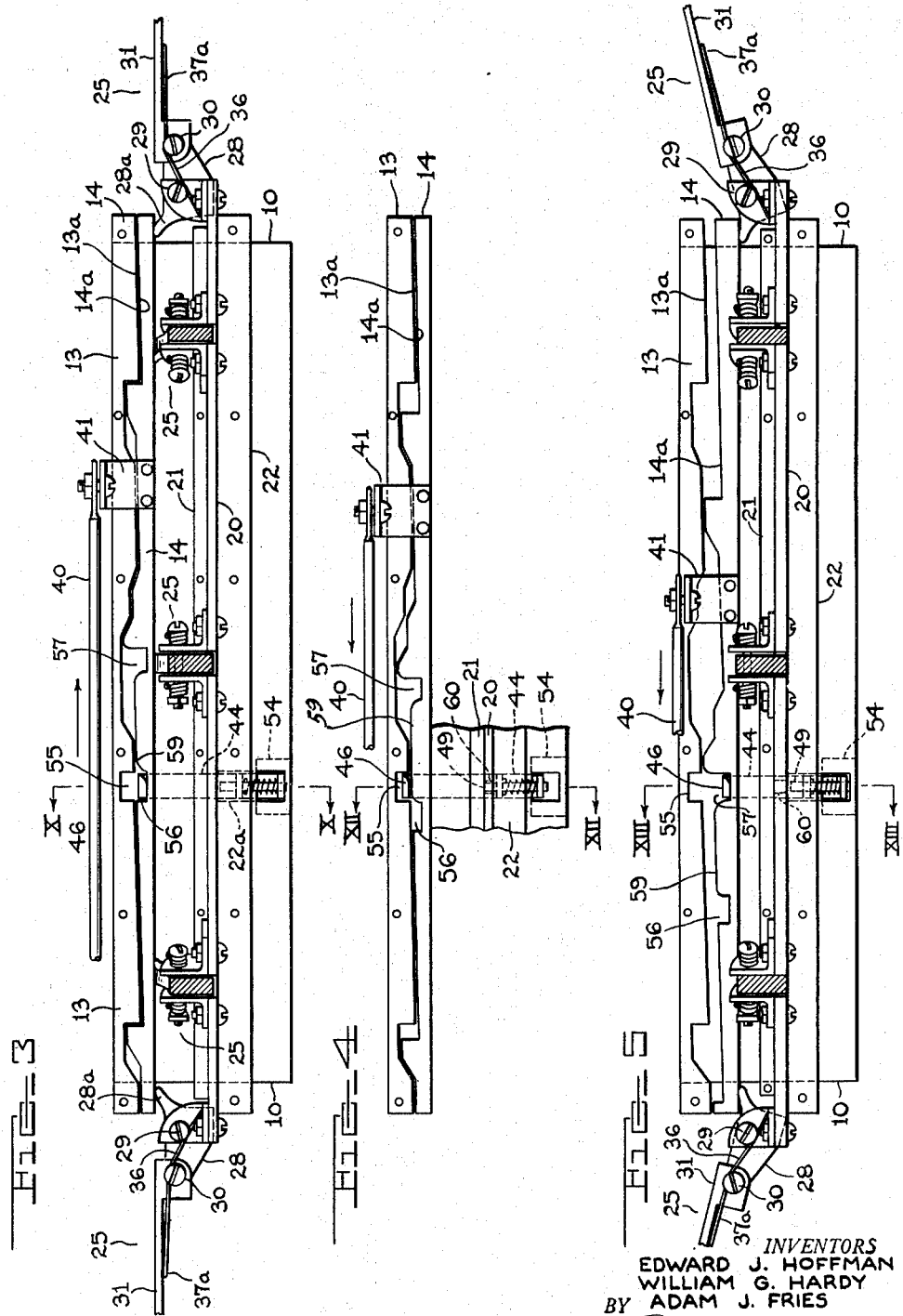
INVENTORS
EDWARD J. HOFFMAN
WILLIAM G. HARDY
BY ADAM J. FRIES
Archworth Martin
ATTORNEY

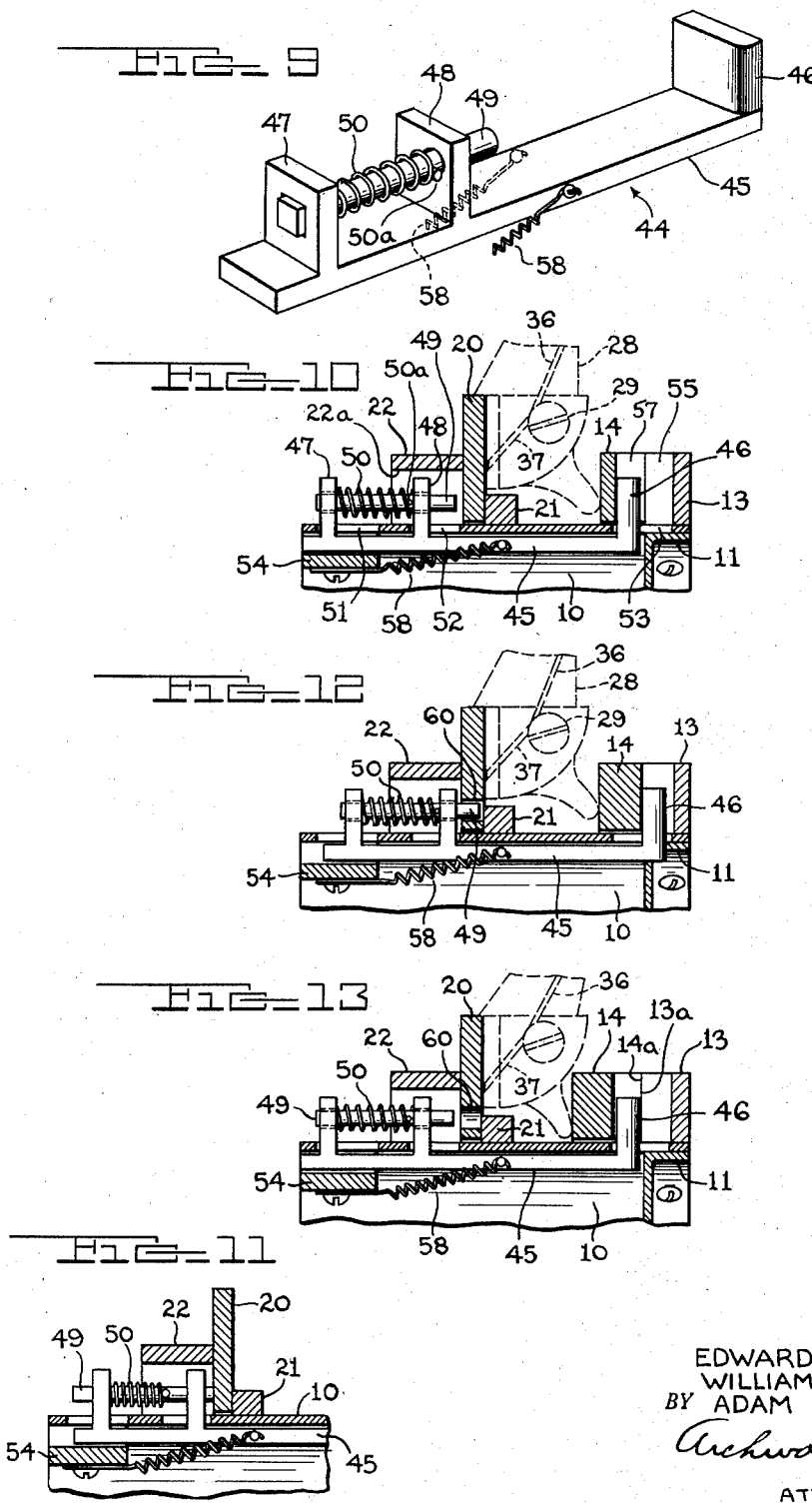

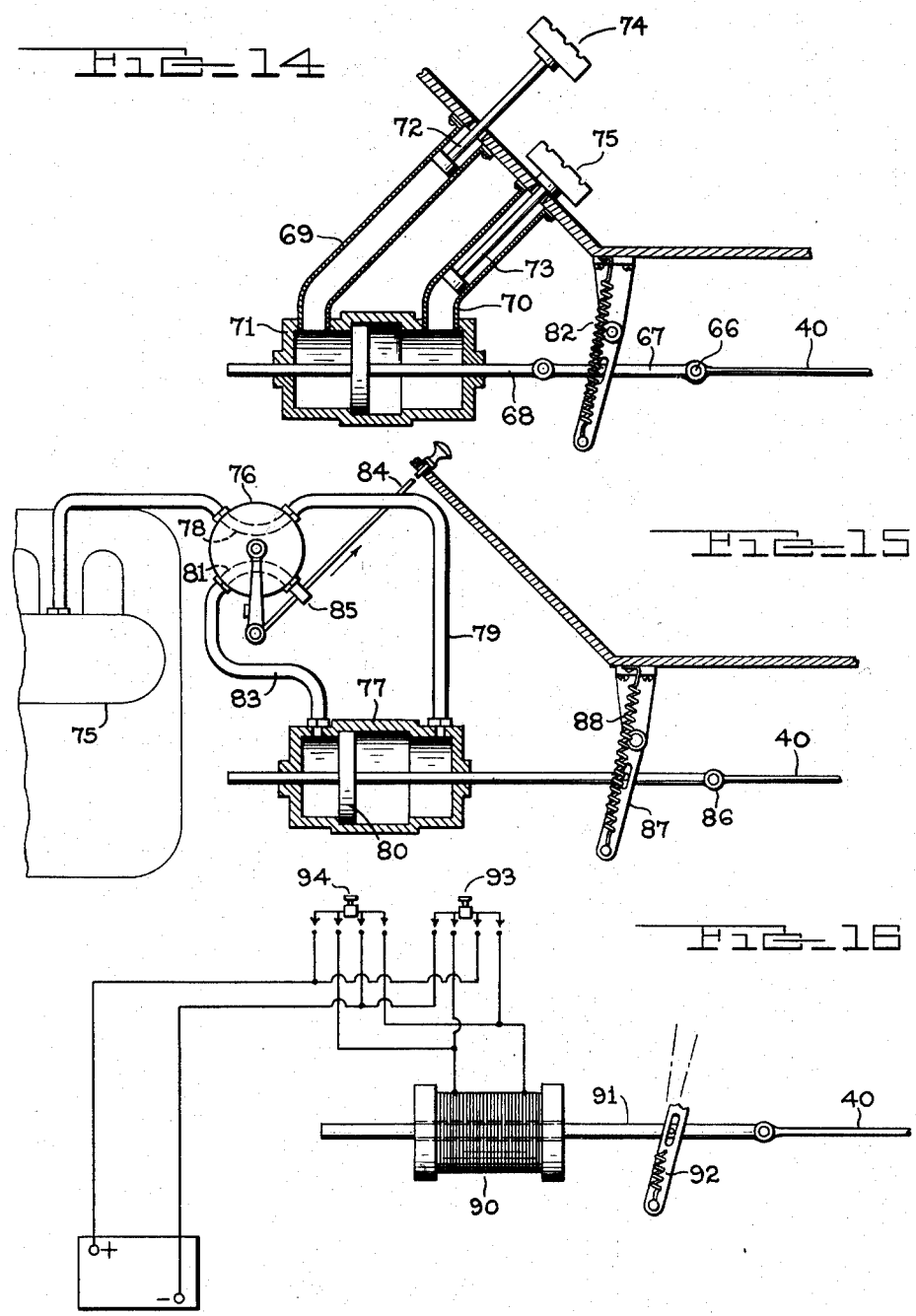

Patented Dec. 5, 1950

2,532,309

UNITED STATES PATENT OFFICE 2,532,309

ANTISKID DEVICE FOR MOTOR VEHICLES

Edward J. Hoffman, William G. Hardy, and Adam J. Fries, Pittsburgh, Pa.

Application April 14, 1948, Serial No. 21,078

14 Claims. (Cl. 152—214)

Our invention relates to anti-skid devices that are particularly suitable for use on the wheels of motor vehicles and which can readily be applied to various existing models of vehicles or can be incorporated as a part of the vehicle at the factory.

One object of our invention is to provide an anti-skid device of the character referred to which can readily be applied to and removed from standard types of vehicles simply through removal of the wheels therefrom.

Another object of our invention is to provide an anti-skid device that can readily be thrown into and out of operation by the vehicle driver and wherein provision is made for idling movement of the anti-skid members upon encountering an obstruction when the anti-skid elements are in inoperative position with respect to the vehicle wheel.

Still another object of our invention is to provide an anti-skid structure wherein the cleats that are engaged by the tire and the roadway will yield readily in various directions and will still be fully effective to perform their function as anti-skid and traction elements.

In the accompanying drawings, Figure 1 is a view partly in section and partly in elevation showing the anti-skid device mounted over a brake drum and in operative position on a tire; Fig. 2 is an outer face view of the anti-skid structure; Fig. 3 is a plan view on an enlarged scale showing the parts of the operating mechanism in the positions occupied thereby when the anti-skid cleats are on a tire as in Fig. 1; Fig. 4 shows certain of the parts at an intermediate stage of their movement toward disengagement of the anti-skid elements from the tire; Fig. 5 shows the members of Fig. 3 in the positions occupied thereby when the anti-skid elements are moved to inoperative position from the tire; Fig. 6 is an enlarged sectional view of a portion of the structure of Fig. 1; Fig. 7 is a view similar to Fig. 6 but showing one of the anti-skid cleats swung to its inoperative position with respect to the tire; Fig. 8 is an enlarged view of the cleat assembly and certain of its operating elements taken on the line VIII—VIII of Fig. 6; Fig. 9 is a perspective view on an enlarged scale of one of the latch elements of Figs. 3 to 5; Fig. 10 is an enlarged view taken on the line X—X of Fig. 3; Fig. 11 is a view of a portion of the structure of Fig. 1, with a latch bolt at an intermediate point between its fully released and its latching position; Figs. 12 and 13 are enlarged views taken on the lines XII—XII and XIII—XIII of Figs. 4 and 5 respectively; Fig. 14 shows a modification of the manual operating mechanism of Fig. 2; Fig. 15 shows still another modification thereof, and Fig. 16 shows means for electrically moving the antiskid elements to their operative and inoperative positions.

It will be understood that each rear wheel of a motor vehicle will be equipped with the apparatus shown in Figs. 1 to 13 and will be operated by the vehicle driver in a suitable manner, to move the anti-skid cleats into and out of operative position on the tire as hereinafter explained.

The apparatus may readily be applied to various standard forms of motor vehicles, and as here shown, has a base member 10 of cylindrical form which can be slid over the brake drum 12, from the outer end of the axle, when the wheel 8 is removed from the vehicle. The base member 10 is connected to a plate 9 that is fixedly mounted on axle housing 7 at the inner side of the drum, by a ring 11 which may be split on a line across its periphery, to permit it to conveniently be sprung into place around the axle and against the inner face of the plate 9, the ring being attached to such inner face by suitable screws.

The anti-skid elements and the operating mechanism therefor are mounted in unitary relation with the base ring 10. A stationary cam ring 13 is secured to the base ring 10 by screws 11a that also rigidly connect the base ring to the ring 11. A movable cam ring 14 loosely encircles the base 10 and has camming surfaces 14a that co-operate with camming surfaces 13a on the ring 13 to effect relative expansive movements of the two rings when the ring 14 is given rotative movement in one direction, as shown more clearly in Figs. 3 to 5.

A cleat ring 20 is rotatably mounted on the base member 10, between guide rings 21 and 22 that are rigidly secured to the member 10. A plurality of cleat assemblies 25 are pivotally connected to ears 26 that are bolted to the ring 20. Each of these cleat assemblies comprises a lever 28 of bell-crank form that is pivotally mounted on a pivot stud 29 that extends through the ears 26. The outer arm of the bell crank lever carries a pivot stud 30 on which a cleat-carrying arm 31 is pivotally mounted, the arm 31 having flanges 31a formed thereon through which the stud 30 extends. The innermost edge of the member 31a limits rotative movement of the arm 31 in a clockwise direction (Fig. 7). A cleat finger 32 having studs 34 is detachably connected to the cleat arm 31 by a bolt and wing nut 33, the innermost end of the cleat being of T-shape and insertible through a slot in the arm 31 to assist the wing nut and its bolt in holding the cleat firmly on the arm 31.

A spring 36 has intermediate portions wrapped around the studs 29 and 30. The spring has an extension 37 that abuts against the ring 20 and is so tensioned as to rock the lever 28 in a counterclockwise direction when the lever end 28a is released by the cam ring 14 for partial swinging movement. The upper portion 37a of the spring 36 biases the cleat-carrying arm 31 in a clockwise direction.

By reason of this arrangement of the spring 36, the cleats and their arms will yield toward and past the position indicated by the dotted lines in Fig. 6, upon some compression of the tire when traveling or if the tire becomes flat, without injury to the cleat assembly. The cleats 32 may suitably be made of spring steel.

When the cam ring 14 is moved from the position of Figs. 3 and 6 to the position shown in Figs. 5 and 7, the bell-crank lever 28 will be rocked in a clockwise direction about its pivot 29 and thus swing the cleats 32 from the operative position of Fig. 6 to the inoperative position of Fig. 7 where they are clear of the tire.

Referring now more particularly to Figs. 3, 4 and 5, a pull rod 40 is connected to an expansion ring 14 by means of a bracket 41. In Fig. 3, the expansion ring 14 has been rotated to such position that its cam surface 14a is in registry with the cam surface 13a of the fixed cam ring 13. In this position, the bell crank levers 28 are allowed to rotate to their extreme position in one direction and the cleats 32 are held snugly against the tread of the tire, by the tension of the spring arm 37.

When the pull rod 40 is moved to its forward position (Fig. 5), it moves the expansion ring 14 rotatively approximately 2 inches, on the base ring 10, thus placing the cam surfaces 13a and 14a out of relation with each other and causing a separation of the cam ring 14 from the ring 13. This forward motion of the expansion ring 14 actuates the levers 28 and rotates the cleat assemblies rearwards about their pivots 29, thus swinging the cleats 32 free of the tire tread. When the cleats 32 are in engagement with the tread of a tire, the cleat ring 20 with its associated cleat assemblies is rotated with the wheel about the base 10.

When the cleats are disengaged from the tread of the tire, a latch assembly is provided to stop the rotating cleat ring 20 at the position where none of the cleats are in engagement with the ground (Fig. 2). To do this, there is provided a latch assembly 44 (Figs. 9–13), comprising a base 45 having a lug 46 on one end, and guide ears 47 and 48 which slidably support a bolt 49 which is held in its projected position by the pressure of a spring 50, against a shoulder 50a. Slots 51, 52 and 53 are provided in the base 10 (Fig. 10) and a slot 22a is provided in the guide ring 22, for insertion of the latch assembly 44. Slots 51, 52 and 53 are wide enough to permit a forward and backward movement of the latch assembly. A housing 54 is bolted to the underside of the base 10 to slidably support the latch assembly 44 for backward and forward movements.

It will be noted from Figs. 3, 4 and 5 that a recess 55 is provided in the surface 13a of the cam ring 13 and recesses 56 and 57 are machined into the cam surface 14a of the expansion ring 14. When these two rings are positioned as shown in Fig. 3 and Fig. 10 (the cleats being on the tire tread), the recesses 55 and 56 are in alignment.

Attached to the base 45 of the latch assembly 44 are springs 58 which are fastened to the latch housing 54. Therefore, in this position, the springs 58 hold the latch assembly so that the lug 46 is seated in the recess 56 and the bolt 49 is not in contact with the cleat ring 20.

Upon slight rotation of expansion ring 14 by means of operating arm 40, to the position of Fig. 4, the lug 46 is carried up out of the recess 56 and onto a raised shoulder 59 of the cam member 14. This moves the latch assembly to the right, bringing the bolt 49 into engagement with the cleat ring 20 (see Fig. 11), the cleat ring being then still revolving with the wheel. In the meantime, the separation of the cam ring 14 from the ring 13 has caused the cleats 32 to be swung free of the tire tread, and the cleat ring 20 is spinning by reason of its inertia. A hole 60 is provided in the cleat ring 20, and when this hole has been carried to latching position, the bolt 49 which has been bearing against the face of the cleat ring (see Fig. 11) is forced into the hole 60 by pressure of the spring 50, thereby stopping the cleat ring in the desired position (see Figs. 2 and 12). Since by the time expansion ring 14 has moved out its full distance (Fig. 5), it has rocked the levers 28 to their extreme release position, against the tension of their spring arms 37, the friction of these levers is sufficient to continue to hold the cleat ring against idling movement from this stationary position. The complete movement of the ring 14 has been made to the position of Fig. 5, the recess 57 is in line with the recess 55, there allowing the lug 46 to fall back into the recess 57 and permit the latch assembly 44 to move to its original retracted position. This removes the bolt 49 from the slot 60 in the cleat ring, and there will be no rubbing of the bolt 49 on the ring 20 during travel of the vehicle.

At this time, the ring 20 is held against rotative movement only by the friction of the bell-crank levers 28 on the cam ring 14. Should the cleats 32 encounter some obstruction such as a curb or a rut in the roadway, the ring 20 with the cleat assemblies will rotate with the wheel until such time as the cleat assemblies reach approximately the position shown in Fig. 2, where none of the cleats have engagement with the road surface. This arrangement, together with the flexibility of the cleats 32 and their pivotally-mounted arms 31 as above explained, provides against damage to the cleat elements when obstructions are encountered or the tire becomes flattened.

To again set the anti-skid device in operation, the driver will move the pull rod backwardly in the direction of the arrows in Fig. 3 to return the ring 14 from the position of Fig. 5 to that of Fig. 3, where the tails 28a of the bell-crank levers are released to allow the springs 36 to swing the cleats 32 across the tire.

The anti-skid elements can be moved to their operative and inoperative positions from the driver's seat, as by a lever 62 that is secured to a rock shaft 63 journaled in a bracket 64 on the floor board or dash board of the vehicle, the pull rods 40, extending to the respective rear wheels, being reciprocated through movement of the lever. A latch 65 is provided for releasably holding the lever in its "on" and "off" positions.

Referring now to Fig. 14, the pull rods 40 are connected to a cross bar 66 which, in turn, is connected by a link 67 to a piston rod 68. Tubes 69 and 70 communicate with the front and rear ends of a cylinder 71 that contains a liquid. Piston-like plungers 72 and 73 operate in the tubes 69 and 70 respectively, to force the liquid into the cylinder to effect operation of the piston and the pull rods 40. Thus when the pedal 74 is depressed, the piston will be moved rearwardly, and the oil displaced at the rear end thereof, will move into the tube 70 and force the pedal 75 upwardly ready for operation of the apparatus in the reverse direction; and vice versa. An over-center spring 82 yieldably holds the rods 40 in their forward and rear positions.

In Fig. 15, we show a fluid-pressure means which can be operated either by suctional force or compressed air and is here shown as getting its motive power from the intake manifold 75 of the vehicle engine. A rotary valve 76 effects communication of the intake manifold with the front and rear ends of a cylinder 77. Thus with the valve in the position shown, there is suctional force through a port 78 in the valve and a pipe 79 to move the piston 80 rearwardly and effect movement of the pull rods 40 in a rearward direction, atmospheric air flowing into the front end of the cylinder through a port 81 in the valve and a pipe 83. When a manually-operated pull rod 84 is drawn outwardly, the port 78 is brought into registry with the pipe 83 and the intake manifold and thereupon the suctional force will be in the front end of the cylinder 77, relief air to the rear side of the piston being supplied through the valve inlet 85, port 81 and pipe 79. A shaft 86 that has connection with the pull rods 40 has pin-and-slot connection with a lever 87 that is held in its extreme positions by an over-center spring 88 which will yieldably hold the pull rods in their extreme forward and rearward positions, to prevent idle shifting of the rods, as in Fig. 14.

In Fig. 16, we show an electro-magnet 90 that may be energized in reverse directions to effect reciprocatory movements of a movable core 91 that is connected to the pull rods 40 and which is provided with an over-center spring 92 that corresponds to the spring 88. Operation by the driver of a push button 93 will close the magnet circuit to effect shifting of the core 91 and the rods 40 in one direction, and a push button 94 will cause current flow through the magnet coil in the reverse direction. These switches will occupy their open positions except when they are momentarily pushed to effect energization of the magnet.

We claim as our invention:

1. Antiskid apparatus for vehicle wheels, comprising cleat members, radially-extending arms carrying the cleat members, a supporting member upon which the said arms are pivotally mounted for movement of the cleats across the wheel tread and which is supported for free rotative movement about the axis of the wheel when the cleats are free of the wheel tread, means yieldably rocking the cleat arms in arcuate paths to move the cleats into engagement with the wheel tread, and a manually controlled device for rocking the cleats out of engagement with the tire tread, in opposition to said yielding means, and for frictionally resisting rotative movement of the said supporting member.

2. Antiskid apparatus for vehicle wheels, comprising cleat members, a supporting member upon which the cleat members are pivotally mounted at one end, for movement across the wheel tread and which is supported for free rotative movement about the axis of the wheel when the cleats are free of the wheel tread, means yieldably holding the cleat members in engagement with the tire tread, and a manually controlled device for rocking the cleats out of engagement with the tire tread, in opposition to said yielding means, and for frictionally resisting rotative movement of the said supporting member, the cleats being yieldable toward the axis of the wheel when applied to a pneumatic tire tread and means for holding the other ends against radial movement outwardly.

3. Antiskid apparatus for vehicle wheels, comprising a base member of cylindrical contour adapted for attachment in fixed relation to a vehicle axle housing, a cam ring on the base and having oscillatory movement about the wheel axis, a cleat ring rotatable on the base, cleat-assemblies each of generally L-form pivotally mounted on the cleat ring, on axes generally tangential to the ring, one leg of each cleat assembly extending across the wheel tread when in operative position and the other leg thereof extending radially inward past the said pivot and engageable with a radial surface of the ring, springs yieldably urging the cleat assemblies about their pivots, in directions toward the wheel, cam surfaces on the other radial face of the cam ring, stationary camming surfaces fixedly mounted on the base member in position to engage the cam surfaces on the ring and shift it radially in opposition to said springs, when the cam ring is given rotative movement in one direction, to thereby rock the cleat assemblies to their inoperative positions away from the wheel, and means for oscillating the cam ring, to effect movements of the cleat elements into and out of engagement with a tire tread.

4. Antiskid device as recited in the next preceding claim, wherein the radially-extending leg of the cleat assembly is in the form of two members pivotally connected at a point intermediate the ends of the leg, and are provided with a spring that yields in a direction toward the wheel and its axle, for flexure at the pivotal point when the tire on the wheel flattens.

5. Antiskid apparatus for vehicle wheel, comprising a base member of cylindrical contour adapted for attachment in fixed relation to a vehicle axle housing, a cam ring on the base and having oscillatory movement about the wheel axis, a cleat ring rotatable on the base, cleat-assemblies each of generally L-form mounted on the cleat ring, means for yieldably urging one leg of each cleat assembly into operative position across the wheel tread, a manually-controlled device engageable with the other leg of each cleat and movable to rock the cleat assemblies to their inoperative position away from the wheel tread, and means for automatically retarding rotative movement of the cleat ring, when the cleat elements have been moved out of engagement with a tire tread.

6. Antiskid device as recited in the next preceding claim, wherein the retarding means first temporarily locks the cleat ring against rotative movement and thereafter frictionally resists idle rotating of the ring.

7. Antiskid apparatus for pneumatically-tired wheels having brake drums to the outer faces of which the wheels are removably connected, comprising a cylindrical base member for placement circumferentially of the base member, means at the inner face of the brake drum, for supporting the base in rigid relation to the wheel axis, a stationary cam ring on the inner end of the base, a movable cam ring mounted for oscillatory and axial movements on the base and having radial camming surfaces cooperating with complementary camming surfaces on the stationary ring, guide rings fixedly mounted on the base, a cleat ring between the guide rings and rotatable on the base, cleat assemblies tiltably mounted on the cleat ring and having cleat fingers movable into positions across the tire tread, means yieldably urging the cleat assemblies and their fingers in one direction, with respect to their movements into and out of operative position on the tire tread, and connections between the cleat assemblies and the movable cam ring, for moving the cleat assemblies and their fingers in opposition to said yieldable means.

8. Antiskid device as recited in the next preceding claim, wherein the yielding means urges the cleat fingers against the tire tread and the movable cam ring moves the fingers to inoperative position.

9. Antiskid apparatus for wheels having yieldable treads, comprising a cleat ring mounted for rotative movement coaxial with the wheel, cleat member pivotally mounted on the ring, on axes generally tangential to the ring and each being of generally L-form with one leg extending radially of the ring and the other leg movable across the tire tread, the radial leg comprising two parts that are pivotally connected in end-to-end relation, with the inner part pivotally connected to the ring and having an extension radially inward of its connection to the ring, a spring yieldably urging each cleat member toward the wheel and across the tire tread, a spring yieldably holding the said two parts in radial alinement, and manually-operable means engageable with said extensions, to rock the cleat member away from the tire, in opposition to the first-named springs.

10. Antiskid apparatus for vehicle wheels, comprising a cleat ring mounted for rotative movement coaxial with the wheel, cleat members pivotally mounted on the ring, on axes generally tangential to the ring and each being of generally L-form with one leg extending radially of the ring and being flexible under endwise thrusts and the other leg movable across the tire tread, the said one leg being detachably connected to a radial portion of the other leg, for replacement when worn, and manually-operable means for rocking the cleat members on their pivotal mountings, in a direction to move their second-named legs away from the wheel treads.

11. Antiskid apparatus for vehicle wheels, comprising cleats each having a free end adapted to be moved across the tread of a tire, a radially-extending arm connected to the other end of each cleat, a supporting member upon which the inner ends of the arms are pivotally mounted, and which is supported for free rotative movement about the axis of the wheel when the cleats are free of engagement with the tire tread, means yieldably urging the arms in a direction to move the cleats through arcuate paths into crosswise engagement with the tire tread, the cleat arms being held against radially outward movement when the cleats are on the tire tread but being flexible toward the axis of the wheel to allow radially-inward movement of the cleats upon deflation of the tire, and a manually-controlled device for rocking the cleats out of engagement with the tire tread in opposition to said yielding means, and for restraining rotative movement of the supporting member when the cleats are disengaged from the wheel tread, and no cleat is engaged between the tire and the road.

12. Antiskid apparatus for vehicle wheels, comprising cleats each having a free end adapted to be moved across the tread of a tire, a radially-extending arm connected to the other end of each cleat, a supporting member upon which the inner ends of the arms are pivotally mounted, and which is supported for free rotative movement about the axis of the wheel when the cleats are free of engagement with the tire tread, means yieldably urging the arms in a direction to move the cleats through arcuate paths into crosswise engagement with the tire tread, the cleat arms being held against radially outward movement when the cleats are on the tire tread but being flexible toward the axis of the wheel to allow radially-inward movement of the cleats upon deflation of the tire, and a manually-controlled device for rocking the cleats out of engagement with the tire tread in opposition to said yielding means, and for holding them against contact with the roadway.

13. Antiskid apparatus for vehicle wheels, comprising a cleat ring mounted for rotative movement coaxial with the wheel, cleat members pivotally mounted on the ring, on axes generally tangential to the ring and each being of generally L-form with one leg extending radially of the ring and being flexible under endwise thrusts and the other leg movable across the tire tread, and manually-operable means for rocking the cleat members on their pivotal mountings, in a direction to move their second-named legs away from the wheel treads.

14. Antiskid apparatus for vehicles of the type wherein the wheels are detachably secured to the outer faces of rotatable brake drums, comprising a base member adapted to be slid into position circumferentially of a brake drum when the wheel is detached from the drum, means for detachably connecting the inner end of the base member to a non-rotatable member of the vehicle, to hold the base member against rotating with the wheel and the drum, a cleat-carrying member rotatable on the base member, cleat members extending radially from the cleat-carrying member, traction elements carried by the cleat members, and means for moving the traction elements into position to engage the roadway and to effect rotation of the cleat-carrying member with the wheel.

EDWARD J. HOFFMAN.
WILLIAM G. HARDY.
ADAM J. FRIES.

REFERENCES CITED

The following references are of record in the file of this patent:

UNITED STATES PATENTS

| Number | Name | Date |
| --- | --- | --- |
| 2,212,076 | Rollings | Aug. 20, 1940 |
| 2,427,510 | Richardson | Sept. 16, 1947 |